United States Patent [19]
Cooper

[11] 3,792,690
[45] Feb. 19, 1974

[54] METHOD AND SYSTEM FOR OPEN CYCLE OPERATION OF INTERNAL COMBUSTION ENGINES

[76] Inventor: Theodore W. Cooper, 1269 Parkwood Dr., Novato, Calif. 94947

[22] Filed: Mar. 22, 1972

[21] Appl. No.: 236,818

[52] U.S. Cl............. 123/3, 123/119 A, 123/119 E, 123/119 R
[51] Int. Cl............................................. F02b 51/00
[58] Field of Search...... 123/119 E, 119 A; 423/218

[56] References Cited
UNITED STATES PATENTS

| | | | |
|---|---|---|---|
| 3,559,402 | 2/1971 | Stone et al....................... | 123/119 A |
| 1,120,828 | 12/1914 | Lowry............................... | 123/119 A |
| 3,677,239 | 7/1972 | Elkins............................... | 123/119 A |
| 3,672,341 | 6/1972 | Smith et al....................... | 123/119 E |
| 3,618,576 | 11/1971 | Dixon ............................... | 123/119 A |
| 2,960,834 | 11/1960 | Patrick............................. | 123/119 E |
| 3,406,014 | 9/1968 | Guerrieri .......................... | 423/218 |
| 3,310,381 | 3/1967 | Guerrieri .......................... | 423/218 |
| 3,121,611 | 2/1964 | Parker............................... | 423/218 |
| 3,425,402 | 2/1969 | Reisacher........................ | 123/119 E |
| 3,602,202 | 8/1971 | Kobayashi..................... | 123/119 E X |
| 3,556,066 | 1/1971 | Muirhead...................... | 123/119 E X |

*Primary Examiner*—Laurence M. Goodridge
*Attorney, Agent, or Firm*—Flehr, Hohbach, Test, Albritton & Herbert

[57] ABSTRACT

A method and system for the open cycle operation of an internal combustion engine to achieve more complete combustion and increased efficiency, and to effectively reduce or eliminate harmful exhaust pollutants. A combustible charge is formed in a combustion chamber of the engine with a given ratio of hybrid air and fuel. The hybrid air is comprised essentially of oxygen from a diatomic oxygen source or in part by oxygen and in part by an oxygen diluent from the engine's products of combustion. The system provides a fuel limited combustion process by establishing a stoichiometric excess of oxygen in the hybrid air of the combustion charge and with the oxygen diluent comprising essentially gaseous carbon dioxide, or a mixture of gaseous carbon dioxide and water, with little or no nitrogen. The combustion process is highly efficient and produces relatively little or no unburned fuel components, and relatively little or no nitrogen oxides, in the exhaust. In one embodiment a portion of the exhaust gases is diverted to produce the diluent which is then combined with diatomic oxygen to form hybrid air in a preset ratio to provide the stoichiometric excess of oxygen with respect to the fuel charge, and the hybrid air is then directed to the combustion chamber on a demand basis. In another embodiment the oxygen is first combined with fuel to form an oxygen/fuel mixture which is added to the exhaust product diluent in an intake manifold. In another embodiment an oxygen/fuel mixture is added to the exhaust product diluent in the combustion chamber. In another embodiment the rate of combustion is limited by providing a hybrid fuel which includes a fuel diluent. In another embodiment the oxygen source comprises a chemical process utilizing a reducing agent for combination with oxygen in atmospheric air by formation of an oxide, followed by an endothermic dissociation of the oxide to release the oxygen for storage under pressure. In another embodiment the oxygen source comprises a physical process which includes liquifying air to extract nitrogen therefrom by fractional distillation and returning the nitrogen to the atmosphere after transferring heat to it from the air being taken in for liquification.

16 Claims, 6 Drawing Figures

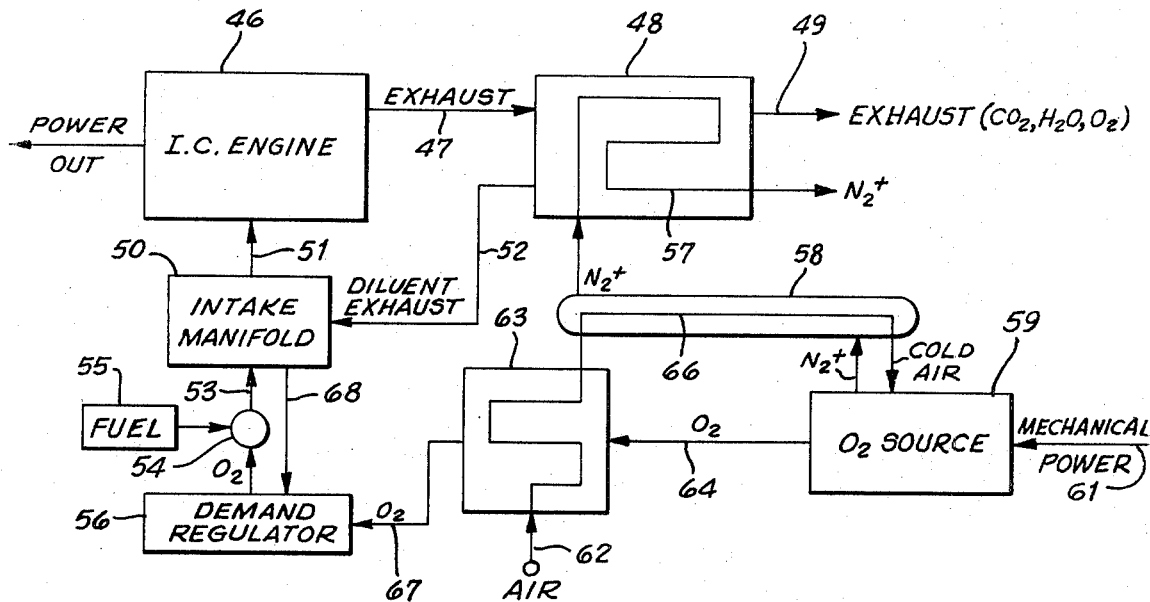
FIG_3
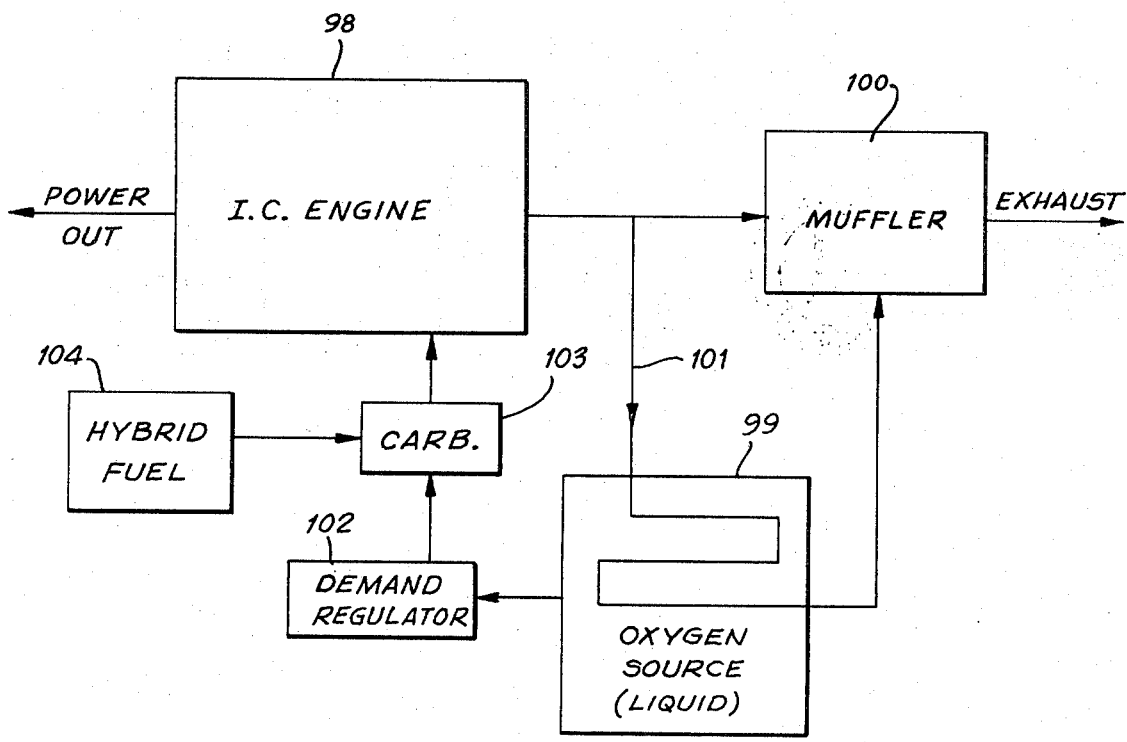
FIG_6

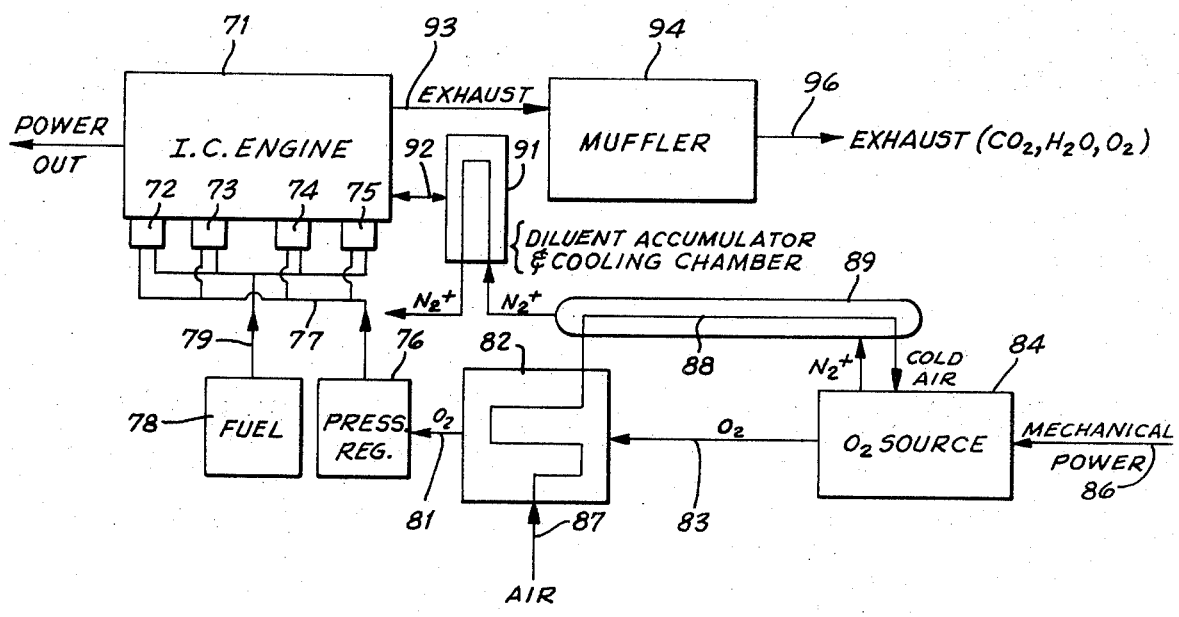
FIG_4
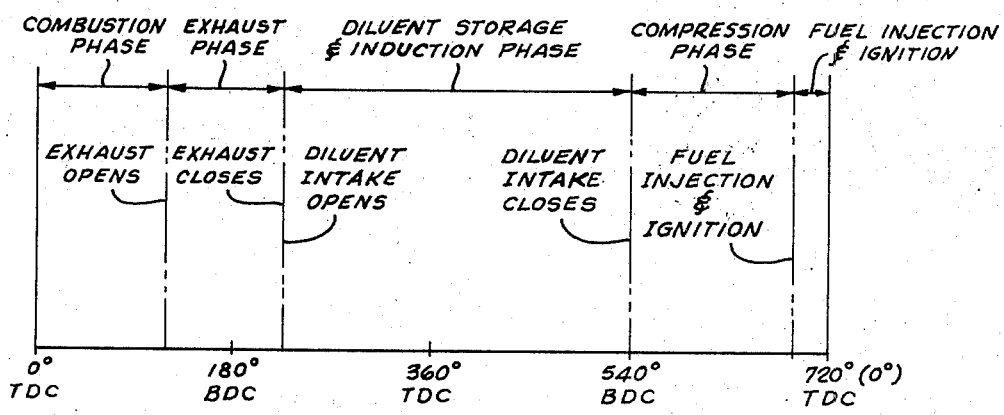
FIG_5

METHOD AND SYSTEM FOR OPEN CYCLE OPERATION OF INTERNAL COMBUSTION ENGINES

BACKGROUND OF THE INVENTION

This invention relates to a method and system for operating an internal combustion engine on an open cycle, i.e., a cycle extracting oxygen, either directly or indirectly, from the atmosphere and exhausting directly to atmosphere, and in particular relates to a method and system of the foregoing nature which by changing the limitation on both combustion and combustion rate provides more complete combustion efficiency and substantially reduces or eliminates harmful pollutants in the exhaust from the engine.

There has been an increasing recognition of the harmful pollution effects from the exhaust components of conventional internal combustion engines. Among the primary reasons that such engines are a serious source of pollution are, first, that combustion of the fuel over the engine's most useful range of power output is limited by the amount of oxygen available in the atmosphere so that oxidation is not complete with a resulting large yield of quantities of carbon monoxide and unburned hydrocarbons in the exhaust, and second, that nitrogen, comprising approximately 80 percent of atmospheric air, dissociates at high combustion temperatures and forms a number of harmful nitrogen oxides which pollute the atmosphere when released in the exhaust. The provision of a sufficient stoichiometric excess of oxygen will cause each combustion charge to become fuel-limited rather than oxygen-limited so that oxidation during expansion and exhaust will be complete. However, where nitrogen is used as the oxygen diluent, as in conventional engines, the combustion rate will then be sufficiently increased by the excess oxygen so that the maximum combustion temperature will be increased with a concomitant increased yield of harmful nitrogen oxides, and other harmful effects such as increased detonation, failure of material due to high temperatures, and the like.

It would be desirable in most cases to provide a system which, when required, either substantially replaces the nitrogen of the combustion charge for an internal combustion engine with one or more components of the exhaust gas as the oxygen diluent, or provides a suitable organic fuel diluent. Such a system would supply the desired stoichiometric excess of oxygen for complete combustion and thus the reaction or elimination of unburned fuel, control the combustion rate and therefore maximum combustion temperatures, and eliminate nitrogen oxides from the engine's exhaust.

OBJECTS AND SUMMARY OF THE INVENTION

It is a principle object of the invention to provide an open cycle method and system for operating internal combustion engines which provides more complete fuel combustion and which substantially reduces or eliminates harmful pollutants in the exhaust from the engine.

Another important object is to provide a method and system which converts the internal combustion engine commonly regarded as being inherently dirty into an engine which may be regarded as being inherently clean.

Another object is to provide an open cycle method and system of the foregoing nature in which the induction charge includes hybrid air comprising oxygen supplied from an oxygen source which extracts diatomic oxygen, either directly or indirectly, from atmospheric air and which exhausts directly to atmosphere.

Another object is to provide a method and system of the foregoing nature in which the combustion charge comprises a fuel, diatomic oxygen and means for limiting the rate of combustion such as an oxygen diluent, a fuel diluent, or the controlled injection of fuel, oxygen or a mixture of oxygen and fuel.

Another object is to provide an open cycle method and system of the foregoing nature in which the oxygen diluent of the induction charge, as required for limiting the combustion rate, is supplied in part or in whole from the gaseous products of combustion thereby reducing or eliminating nitrogen as the diluent. As a result nitrogen oxides are substantially reduced or eliminated from the exhaust while at the same time the chemical equilibrium temperature of combustion, and therefore the combustion rate, is limited throgh dissociation of diluent and combustion products. A portion of the energy of combustion is thereby momentarily stored for later release upon reformation of the dissociated materials during expansion and exhaust. Reformation is assured by virtue of the excess oxygen present and because the dissociated materials are oxygen and combustibles.

The foregoing and additional objects and features of the invention are provided by an open cycle method of operation and system for an internal combustion engine which includes a source of diatomic oxygen such as provided by chemical or from the extraction from the atmospheric air, or by liquified oxygen and the like. A quantity of the diatomic oxygen is combined with a quantity of oxygen diluent, which is comprised at least in part by products of combustion from the engine, to form a charge of hybrid air having predetermined stoichiometric excess of oxygen for combusting a charge of fuel. Thus, the combustion charge of hydrid air and fuel is comprised of diatomic oxygen, in stoichiometric excess, a fuel, and an oxygen diluent in sufficient quantity to properly limit the rate of combustion where such a limitation is not effected by other means, such as controlling fuel injection rate or by a dissociable fuel diluent, although any order of combination of these components of the charge lies within the invention. In one embodiment the hydrid air is formed by compressing a predetermined ratio of oxygen and exhaust gasses and then regulating the flow of compressed hybrid air to the engine on a demand basis. In another embodiment the oxygen is combined with fuel in proper proportion, and directed into the engine where a portion of the gasses from the exhaust phase of the engine comprises the oxygen diluent for the combustion charge. In another embodiment an oxygen/fuel mixture is combined with exhaust product diluent in the intake manifold for induction into the engine. In another embodiment a hydrid fuel which includes a fuel diluent is provided to limit the rate of combustion.

Additional objects and features of the invention will become apparent from the following description in which the preferred embodiments of the invention have been set forth in detail in conjunction with the drawing.

BRIEF DESCRIPTION OF THE DRAWING

FIG. 3 is a schematic diagram of another embodiment of the invention;

FIG. 4 is a schematic diagram of another embodiment of the invention;

FIG. 5 is a chart illustrating a preferred valve timing arrangement for an engine used with the embodiment of FIG. 4;

FIG. 6 is a schematic diagram of another embodiment of the invention.

DESCRIPTION OF THE PREFERRED EMBODIMENTS

Figure 1:
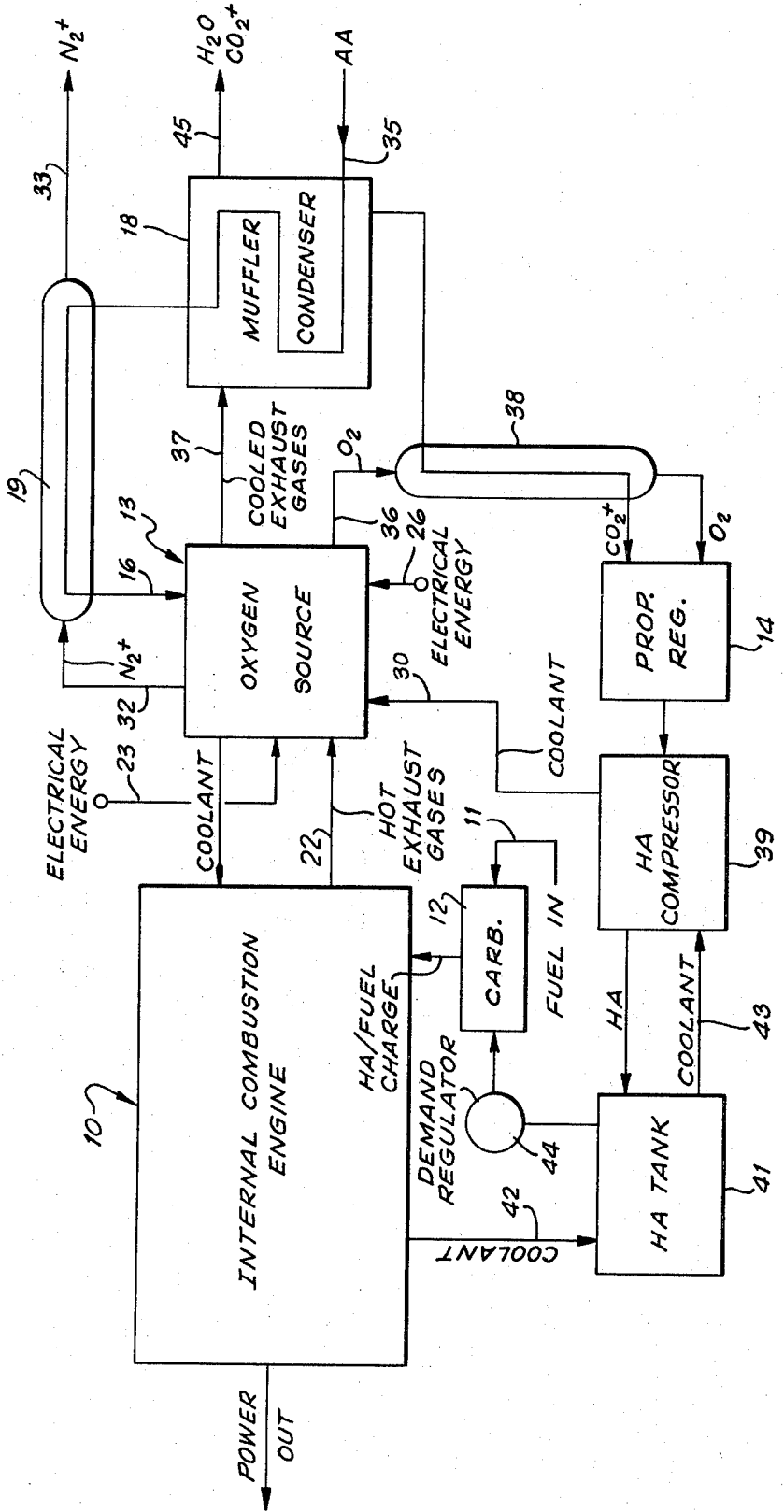
FIG. 1 is a schematic diagram of an internal combustion engine system for carrying out the method of the invention.

In the drawings FIG. 1 illustrates a preferred embodiment of the invention incorporating an internal combustion engine system which is suitable for substantially reducing or eliminating the harmful exhaust pollutants under most conditions of operation at least after an engine's warm-up period. In the system a suitable internal combustion engine 10 of either conventional Otto cycle or Diesel cycle operation, or of reciprocating or rotary design, including gas turbines, is provided and incorporates one or more combustion chambers and suitable intake and exhaust manifolding. Aspiration for fuel induction from an inlet 11 connected with a source of fuel such as liquid hydrocarbon fuel is provided by a suitable carburetor 12, although the invention will also find use in engine designs utilizing fuel injection rather than carburetion.

An intake charge of hybrid air, designated herein as HA, is combined with a charge of fuel for a fuel-limited combustion process. The hybrid air comprises diatomic oxygen ($O_2$) present in the range of from about 15 to 100 percent by weight with the remainder of an oxygen diluent comprised at least in part by products of combustion. The oxygen diluent functions to limit the rate of combustion so that the period of combustion is spread over a longer time span in relation to the combustion which would occur between fuel and pure oxygen alone. It is preferred for the embodiment of FIG. 1 that the quantity of $O_2$ in the HA is sufficient to form a stoichiometric excess of oxygen in the range of 0–25 percent by weight for combusting a predetermined charge of fuel, and to assure that the combustion is fuel limited.

The embodiment of FIG. 1 forms the substantially nitrogen free hybrid air by utilizing a portion of the exhaust products, which initially are comprised of largely carbon dioxide and water vapor, through a system in which the water vapor is removed and a portion of the carbon dioxide is combined with diatomic oxygen from oxygen source 13 in proportioning regulator 14. The method and system of the invention is open cycle in operation in that the pollutant-free waste gasses from the overall system are exhausted directly to atmosphere while oxygen is extracted from the atmosphere either directly or indirectly. In addition, in the embodiment of FIG. 1 the supply of oxygen is extracted directly from atmospheric air, designated AA, through oxygen source 13 which comprises the sub-system of FIG. 2 for chemically separating oxygen from air, although the oxygen source may be of suitable type, either chemical or physical or may comprise bottled compressed oxygen or liquified oxygen.

Figure 2:
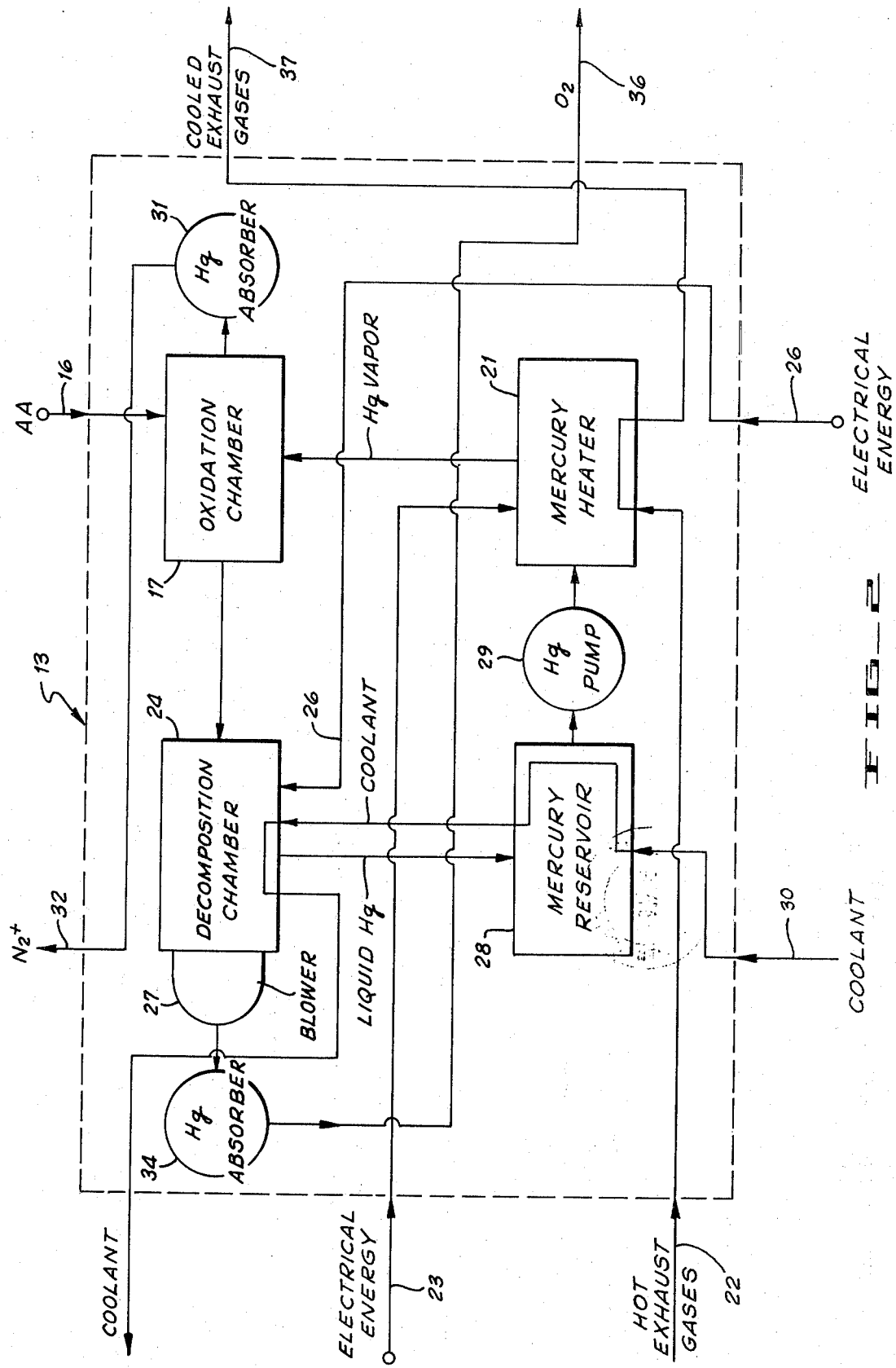
FIG. 2 is a schematic diagram of the oxygen source for the system of FIG. 1.

A suitable chemical separator for oxygen source 13 as illustrated schematically in FIG. 2 provides a process in which a reducing agent comprising vaporized mercury is formed into an oxide in an exothermic reaction, the oxide is removed and decomposed is an endothermic reaction into mercury and oxygen constituents, and the oxygen is separated for storage as the mercury is returned for another cycle. Atmospheric air which is cleaned and pre-heated to a temperature within the range of 180° to 480° F, depending upon the particular catalysts employed (preferably Manganese Dioxide) and further depending upon the mercury vapor temperature, is directed at 16 into an oxidation chamber 17 in a fast flowing stream. The incoming air preferably is pre-heated by heat transfer from the exhaust gasses, in the muffler-condenser 18 of FIG. 1, and by heat transfer from heat exchanger 19 through which separated nitrogen exhausts from the oxygen source. A mercury heater 21 is provided to generate mercury vapor at a temperature within the range of 615° to 1,800° F, and this vapor is injected into an oxidation chamber 17 in a direction counter to the flow of incoming air to create turbulence and enhance mixing within the oxidation chamber. The heat for vaporizing the mercury within the heater 21 is provided by passing the hot exhaust gasses from the engine through circuit 22 of FIG. 1, and as required, from an electric energy source 23 controlling suitable means such as resistance heating elements. Mercury oxides are formed exothermically in oxidation chamber 17, chiefly through the formation of mercuric oxide according to the chemical equation:

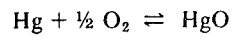

$$Hg + \tfrac{1}{2} O_2 \rightleftharpoons HgO$$

The reaction conditions of pressure, temperature and material concentration are established to favor formation of HgO. The solid particulate mercury oxides are transferred by suitable means to the low pressure decomposition chamber 24 where the oxides float upon a pool of liquid mercury of decomposition. The oxides are decomposed in an endothermic reaction into mercury and diatomic oxygen with the energy for decomposition being supplied by suitable means such as high intensity ultra violet lights of about 2,537A and 1,849A wave lengths for absorption by the mercury and the oxygen, respectively, of the oxides. Energy for the ultra voilet lights is supplied through circuit 26 from a suitable electric energy source. The oxygen of decomposition is removed from chamber 24 by suitable gas blower 27 while the mercury of decomposition which is formed in the liquid pool is directed to a mercury reservoir 28.

A mercury pump 29 pumps liquid mercury from reservoir 28 for recycle to mercury heater 21. A suitable coolant, preferably from the engine cooling system, is circulated through circuit 30 serially through mercury reservoir 28 and decomposition chamber 24 for cooling these respective composition to maintain proper temperature levels.

Gaseous nitrogen and other gasses remaining from the atmospheric air after separation of oxygen therefrom in oxidation chamber 17 are passed through a suitable mercury vapor absorber 31 to remove all traces of mercury vapor. The $N_2^+$ is then directed through circuit 32 into heat exchanger 19 from which it is exhausted to atmosphere through outlet 33. Similarly, the oxygen which is removed from decomposition chamber 24 is passed through a mercury vapor absorber 34 which also removes all traces of mercury vapor in the stream of oxygen exiting through circuit 36.

Another oxygen separation process which may be utilized in the invention is that known as Brin's process in which barium dioxide is formed when barium oxide is heated in air to about 500° C. according to the following reaction:

$$2BaO + O_2 \rightarrow 2BaO_2$$

Upon heating the barium dioxide to a higher temperature on the order of 800° C, or if the pressure is reduced without altering the temperature, diatomic oxygen is given off and barium oxide remains as a residue according to the following reaction:

$$2BaO_2 \rightarrow 2BaO + O_2$$

Barium oxide is thus suitable for use in the invention as the reducing agent which reacts in an oxidation chamber of the type described with the oxygen of atmospheric air to form a higher oxide, and this higher oxide is transferred to a decomposition chamber of the type described where it is decomposed for liberating diatomic oxygen with the resulting lower oxide being recycled.

A number of other metals which are characterized in having higher oxides that lose oxygen upon heating to give a residual lower oxide may also be utilized in the invention. As an example, the oxides of manganese and lead liberate oxygen according to the following reactions:

$$3MnO_2 \rightarrow Mn_3O_4 + O_2$$

$$2PbO_2 \rightarrow 2PbO + O_2$$

$$2Pb_3O_4 \rightarrow 6PbO + O_2$$

The oxides of the so-called noble metals of mercury, gold and silver decompose completely upon heating and may also be utilized in a recycling process of the type described to separate oxygen from atmospheric air.

The exhaust gasses from the engine, after giving up a portion of their heat energy in the mercury heater of oxygen source 13, are directed through circuit 37 into muffler-condenser 18 where they flow in heat exchange relationship with the inlet 35 for the incoming atmospheric air. The exhaust gas mixture is thereby cooled at a temperature below its dew point so that a substantial amount of the water vapor in the exhaust is condensed and separated from the remaining exhaust product, symbolized $CO_2+$, which comprises principally $CO_2$ and the excess oxygen remaining from the combustion process. A portion of the $CO_2+$ is directed through heat exchanger 38 in heat exchange relationship with circuit 36 directing oxygen from source 13 for temperature equalization with, and for diluting, the flow of supply oxygen to yield a properly proportional hybrid air mixture.

From heat exchanger 38 the $O_2$ and $CO_2+$ are directed into the proportioning regulator 14 which mixes the two supply flows at a pre-selected ratio suitable for maintaining the desired stoichiometric excess of oxygen for combusting each charge of fuel introduced into the engine. Since the combustion is fuel limited a constant weight ratio of hybrid air to fuel can be supplied to the engine by carburetor 12 at all levels of power output so long as the hybrid air is comprised of a constant proportion of oxygen and diluent. Preferably regulator 14 is of suitable design which utilizes a spring loaded piston (or diaphragm) actuated responsive to oxygen pressure from source 13 to conjointly vary the flow orifice areas which meter both $O_2$ and $CO_2$ in a predetermined proportion. Fine adjustment of the relative proportion of $O_2$ in the mixture is accomplished through adjustment of the spring force on the piston.

The $O_2$ ratio in the hybrid air mixture is established from predetermined calculations based upon the particular type of fuel employed and the HA to fuel ratio to be used to provide a stoichiometric excess of oxygen between the limits of 0 – 25 percent by weight so that complete combustion is assured. It will be assumed for the following examples that octane ($C_8H_{18}$) is employed as the fuel. Octane undergoes the combustion reaction $C_8H_{18} + O_2$  $H_2O + CO_2$, and 12.5 moles of oxygen are required for stoichiometric combustion of 1 mole of octane. For a first example, utilizing $CO_2 +$ as the diluent comprising 70 percent by volume $CO_2$ and product oxygen, proportioning regulator 14 is adjusted to provide an 8 percent stoichiometric excess of oxygen (of which 12.7 moles are supplied by the oxygen source and the remainder from product oxygen). The hybrid air constituents would be 13.5 moles of $O_2$ and 31.5 moles of $CO_2$, per mole of fuel. For a second example, utilizing total exhaust ($CO_2$, $H_2O$ and product oxygen) as the diluent comprising 60 percent by volume of the hybrid air regulator 14 is again adjusted to provide an 8 percent stoichiometric excess. In this case, 12.96 moles of oxygen are supplied by the oxygen source for the hybrid air per mole of fuel since about 54 percent of the excess product oxygen (0.46 moles) is returned for reuse with the exhaust gasses used as diluent.

Proportioning regulator 14 directs the flow of hybrid air into a suitable compressor 39, which may be powered by suitable means such as from the drive shaft of the engine or an electrical energy source, and which compresses the hybrid air to a pressure within the range of 3 – 10 atmospheres for accumulation in pressure tank 41 having a sufficient capacity to accommodate a range of load requirements and accommodate variations in the system between hybrid air usage and replacement. A suitable coolant, preferably the coolant from the engine's cooling system, is directed through the circuits 42 and 43 for cooling the storage tank and compressor, and then through circuit 30 for use as described in oxygen source 13.

Means are provided to direct a charge of the hybrid air into the combustion chamber for mixture and combustion with the fuel charge, and this means includes a demand regulator 44 coupled with the preferred carburetor 12. The demand regulator comprises a suitable pressure responsive valve which maintains a downstream flow of hybrid air at a predetermined pressure level responsive to engine demand which varies in accordance with engine speed and throttle opening of the carburetor to thereby establish the required pressure differential in the induction manifold leading to the combustion chamber. For example, the delivery pressure of regulator 44 can be preset at substantially two atmospheres in order to provide for a rapid engine response to changes of throttle opening whereby all induced combustion charges carry an excess of oxygen to assure a fuel-limited combustion process. Because the fuel charge is aspirated in the carburetor substantially as a function of hybrid air flow rate, changes in fuel flow are varied only by changes in hybrid air flow. Thus, the carburetor provides the engine with a substantially constant hybrid air to fuel ratio, except at idle conditions where the hybrid air to fuel ratio would be increased by suitable means such as by reducing fuel jet orifice area to provide additional excess oxygen in proportion to the increased oxygen dilution resulting from a greater volume of clearance gases relative to induced charge within the combustion chamber at idle. In some cases it would be desirable to circulate a suitable coolant, such as coolant form the engine's cooling system, into regulator 44 to add heat to the incoming flow of hybrid air and thereby offset the cooling effects of hybrid air expansion through the regulator.

In the embodiment of FIG. 1 at least a portion of the excess oxygen passing through the exhaust circuit leaving the combustion chamber is expelled from the system through exhaust outlet 45 along with condensed water and excess carbon dioxide. The system could include a suitable cold water exhaust gas seal, not shown, in the exhaust line to atmosphere which would exhaust only water and dissolved carbon dioxide from the system with excess oxygen being returned to the hybrid air circuit. In such cases, upon the establishment of sufficient excess oxygen for combustion the additional oxygen required from source 13 would only be the stoichiometric amount required for combustion of the fuel on a steady state basis.

The quantity of $CO_2+$ required as diluent for a combustion charge is determined by combustion process thermodynamics which establish the maximum chemical equilibrium temperature or maximum possible temperature of combustion for the engine. This makes the diluent required dependent upon many engine design factors such as compression ratio, power output capacity, combustion chamber configuration, cooling system capabilities, fuel properties, carburetor capacity and the like. In the illustrated embodiment the constitutent proportions of combustion charge are established empirically as a matter of engine tuning using a dynamometer and guided by exhaust gas analysis. The minimum amount of excess oxygen which will eliminate harmful pollutants from an engine's exhaust is established along with the proportion of $CO_2+$ necessary to maintain the desired engine combustion characteristics and operating temperatures under load conditions.

While the foregoing embodiment involves the combination order in which oxygen and diluent are first combined and fuel is then added, the invention contemplates that any order of combining the three constituents of oxygen, fuel and diluent may be employed. For example, hot exhaust gas may be first combined with fuel in a fuel and diluent vapor chamber at a temperature in the range of 212° to 800° F to form a vapor combined in a carburetor with the diatomic oxygen from a demand regulator in a predetermined proportion to supply a vapor combustion charge having an excess of oxygen sufficient to cause combustion to be fuel limited, and the entire vapor mixture is distributed to the combustion chambers through the intake manifold.

Other preferred embodiments of the invention illustrated by the schematic diagrams of FIGS. 3 and 4 employ the combination order in which fuel and the diatomic oxygen are combined before the oxygen diluent is added. In the methods of these embodiments the total exhaust gases are utilized as the oxygen diluent and this requires that the diluent be used at an elevated temperature to prevent condensation of the exhaust product $H_2O$. The embodiment of FIG. 3 is preferred for use with an internal combustion engine incorporating fuel induction while the embodiment of FIG. 4 is preferred for use with an engine incorporating fuel injection, e.g. an engine operating on a Diesel cycle.

Referring to FIG. 3 there is disclosed apparatus suitable for carrying out the method of the embodiment utilizing fuel induction into a suitable internal combustion engine 46 such as a reciprocating or rotary piston engine incorporating an exhaust manifold directing exhaust products through circuit 47 into back pressure muffler 48, and outlet 49 directs the exhaust products, comprised essentially of $CO_2$, $H_2O$, and $O_2$, to the atmosphere. An intake manifold 50 is connected with the engine's combustion chambers through circuit 51. Intake manifold 50 receives diluent exhaust gases from muffler 48 through a circuit 52 at a pressure which is proportional to exhaust gas outflow and which has a upper limit of about three atmospheres. The diluent gases entering circuit 52 are cooled in muffler 48 to a temperature (preferably in the range of 350°–500° F) sufficient to provide the required diluent quantity at these pressures but without condensing water vapor so that total exhaust gases may be used as diluent.

An oxygen/fuel mixture is combined with the diluent exhaust in intake manifold 50 from a circuit 53 leading from high pressure carburetor 54. Carburetor 54 receives the fuel, preferably a liquid hydrocarbon fuel, from fuel source 55 and diatomic oxygen from demand regulator 56 for mixture at a predetermined proportion, preferably approximately 13.5 moles of oxygen per mole of octane fuel.

The diluent exhaust gases are cooled within muffler 48 to the desired temperature level by passing gaseous nitrogen and trace gases such as argon (designated $N_2+$) through a heat exchange circuit 57 disposed in the muffler and leading from a heat exchanger 58 which in turn receives $N_2+$ discharging from oxygen source 59.

Oxygen source 59 preferably is of the type which physically separates oxygen from the atmosphere utilizing known fractional distillation principles. Mechanical power is received at 61 for compressing and liquifying atmospheric air which is then fractionally distilled into its components of nitrogen and oxygen at a pressure in the range of 6 to 8 atmospheres. A first cooling stage circuit 62 directs incoming atmospheric air in heat exchange relationship with an oxygen storage chamber 63 so that the incoming air is pre-cooled by oxygen received through circuit 64 leading from oxygen source 59. A second cooling stage for the incoming atmospheric air is provided by passing it through through a circuit 66 extending through heat exchanger 58 which receives the $N_2+$ evaporating at a very low temperature (approximately −240° F) prior to its being exhausted to atmosphere.

The oxygen within tank 63 is stored at a pressure of four atmospheres or more. Demand regulator 56 withdraws oxygen from the storage tank through circuit 67 and supplies it to carburetor 54 on a demand basis at a pressure which is a minimum of one atmosphere above the pressure in the intake manifold 49. Regulator 56 is responsive to the pressure reference in the intake manifold through a pressure sensing circuit 68.

Referring to FIG. 4 there is disclosed apparatus suitable for carrying out the method of the embodiment incorporating an internal combustion engine 71 with fuel injection. A plurality of oxygen/fuel injections 72 – 75 are provided for injecting the proportioned oxygen/fuel mixture into respective combustion chambers of the engine. Diatomic oxygen is directed at a pressure of approximately five atmospheres from a pressure regulator 76 through manifolding circuit 77. A source of fuel 78, preferably a liquid hydrocarbon fuel, is supplied to the injectors through manifolding circuit 79.

Oxygen is supplied to regulator 76 through circuit 81 from an oxygen storage tank 82 which is turn receives oxygen through circuit 83 from oxygen source 84. Oxygen source 84 preferably is of the type described in connection with the embodiment of FIG. 3 by which mechanical power at 86 compresses and liquifies atmospheric air for fractional distillation into its components of nitrogen and oxygen at a pressure between six to eight atmospheres. Incoming air is passed through a first cooling stage circuit 87 in heat exchange relationship with the oxygen in storage tank 82, and through a second cooling stage circuit 88 in heat exchange relationship with $N_2+$ passing into heat exchanger 89 from the oxygen source.

A diluent accumulator and cooling chamber 91 is provided in communication with the diluent intake of the combustion chambers through reverse flow circuit 92. Chamber 91 functions to receive a portion of the products of combustion exhausting from the combustion chambers for accumulation under pressure and cooling for subsequent redirection back through circuit 92 into the combustion chamber during the intake phase to serve as the oxygen diluent for the subsequent combustion phase. The remaining portion of the products of combustion which are not directed into chamber 91 are exhausted through circuit 93 into a suitable muffler 94. From the muffler this exhaust portion, comprised essentially of $CO_2$, $H_2O$ and $O_2$, is directed to atmosphere through outlet 96.

FIG. 5 illustrates an exemplary valve timing chart comprising a valve timing arrangement suitable for operating the engine 71 of four stroke-cycle design to provide the required compression and accumulation of the exhaust products for the diluent function. The illustrated valve timing is achieved by means such as by providing a suitable cam grind effective to establish closure of the exhaust valve, and opening of the intake valve, at substantially 45° of crankshaft rotation after BDC (Bottom Dead Center) following the exhaust phase so that approximately 50 percent of the exhaust gases are compressed and accumulated within circuit 92 and chamber 91. The exhaust valve opens at 60° before BDC following the combustion or expansion phase, while the diluent intake closes at BDC following the induction phase.

When using hybrid air comprised substantially of diatomic oxygen in the combustion charge it is usually necessary to limit the combustion rate by some means other than oxygen diluents. Among these combustion rate limiting means are those utilizing a diluent (hybrid fuel) or the control of injection rates of either fuel, oxygen, or a mixture of fuel and oxygen. When fuel injection is employed diatomic oxygen may be inducted through the intake manifold in proper proportion to provide the stoichiometric excess for the injected fuel charge. When oxygen injection is employed, prevaporized fuel in proper proportion may be inducted into the combustion chamber from a vapor fuel accumulator. Rate-controlled oxygen/fuel mixture injection may be employed as disclosed in the diagram of FIG. 4 by removal of the engine's intake valves and the diluent accumulator 91, and by using conventional exhaust timing. In these cases the rate of injection is established to limit the rate of combustion by initiating the injection at, for example, from 5° to 35° BTDC (degrees of crankshaft rotation), depending upon engine speed, and completing the injection at about 10° ATDC.

FIG. 6 illustrates another preferred embodiment of the invention in which the combustion rate and chemical equilibrium temperature in an internal combustion engine 98 are limited by use of fuel diluents of the type which disassociate at high temperature and recombine with oxygen in the combustion charge to form carbon dioxide and water in the exhaust. The fuel diluents useful with the invention are characterized as a group in that they comprise organic chemicals whose molecules contain atoms of oxygen, hydrogen and carbon. Included among such fuel diluents are organic acids such as acetic, oxalic, formic, glycolic and peracetic acid. Other organic chemicals useful as fuel diluents in the invention are glycerol, methylhydroperoxide and dimethyl carbonate. It is understood that these specific chemicals are identified as examples only and not by way of limitation. The fuel diluents useful with the invention are further characterized in having a sufficient solubility in the specific fuel being used to create a stable hybrid fuel, together with a chemical heat of formation on the order of, or exceeding, its chemical heat of combustion.

The schematic diagram of FIG. 6 illustrates apparatus suitable for carrying out the method of this embodiment. A diatomic oxygen source 99 is provided and this oxygen source is illustrated as liquified oxygen. A portion of the hot gases exhausting from engine 98 into muffler 100 are by-passed through the circuit 101 in heat exchange relationship with the liquid oxygen to supply sufficient heat for evaporating oxygen at a pressure in the range of 3 to 23 atmospheres, with this by-pass exhaust then being directed to muffler 100.

The evaporate diatomic oxygen is directed to a suitable demand regulator 102 adjusted to supply oxygen upon a demand basis to a suitable carburetor 103 which aspirates hybrid fuel from supply tank 104 for induction of the combustible charge into the intake manifold of the engine.

When the hybrid fuel comprising the liquid hydrocarbon and the proper fuel diluent is combusted in engine 98 at high compression with an excess of oxygen, as determined by the adjustment of regulator 102, a proper limitation and uniformity of the combustion rate is obtained so as to eliminate the requirement for fuel antiknock additives such as tetraethyllead, tetramethyllead, and the like, and thus eliminate solid particulate pollutants such as lead in the engine's exhaust.

It will be understood that various changes in the details, material, steps and arrangement of components, which have been described and illustrated in conjunction with the specific embodiments to explain the nature of the invention, may be made by those skilled in the art within the principle and scope of the invention as expressed in the appended claims.

I claim:

1. An open cycle method of operating an internal combustion engine system having means forming at least one combustion chamber, a source of liquid or gaseous fuel and having intake, compression, combustion and exhaust phases in its cycle, including the steps of separting oxygen from atmospheric air by chemical process using engine waste heat to provide a source of gaseous diatomic oxygen, forming a quantity of hybrid air free of nitrogen by combining said diatomic oxygen together with an oxygen diluent comprising carbon dioxide taken from a first portion of the products of combustion from said exhaust phase, combining a given charge of said fuel with a quantity of said hybrid air to form a combustion charge free of nitrogen and containing oxygen in an amount to completely combust said charge of fuel, and combusting said charge with said quantity of oxygen whereby the rate of combustion of said fuel charge and oxygen is limited by said oxygen diluent and the products of combustion from said system are substantially released during engine operation.

2. A method as in claim 1 in which said combustion rate is limited by forming and storing under pressure for use upon engine demand a quantity of hybrid air, said hybrid air being formed of said diatomic oxygen together at equal temperatures with said diluent carbon dioxide taken at a substantially constant volume ratio of said diatomic oxygen to diluent carbon dioxide effective to:
  a. form a stiochiometric excess of oxygen sufficient to completely combust the fuel in said combustion charge, said charge being formed at a substantially constant weight ratio of said fuel to hybrid air, said hybrid air being supplied to said combustion chamber prior to said compression phase, and
  b. supply sufficient diluent carbon dioxide to limit the rate of combustion of said fuel in said combustion charge substantially by the temporary thermal dissociation of said diluent during at least a portion of said combustion phase.

3. A method as in claim 2 in which said combustion charge is formed of said fuel charge and said hybrid air which is inducted into said combustion chamber, and said combustion charge provides a stiochiometric excess of oxygen within the range of 0–25 percent by weight of oxygen for completely combusting said charge of fuel, said excess of oxygen required being a function of the amount of diluent used in said combustion charge.

4. A method as in claim 2 in which said first portion of the products of combustion is established at a temperature below the dew point of the water vapor of said first portion by passing the incoming atmospheric air for subsequent oxygen separation in heat exchange relationship with said first portion to preheat said atmospheric air and to substantially remove said water vapor whereby said diluent is comprised substantially of carbon dioxide gas together with excess oxygen.

5. A method as in claim 2 in which said hybrid air is compressed and accumulated following said exhaust phase, and said compressed hybrid air is directed into said combustion chamber with said fuel during the intake phase to form a combustion charge.

6. A method as in claim 2 in which said products of combustion comprising substantially $CO_2$ and $H_2O$ in gaseous form are largely removed during engine operation from said combustion chamber and passed in heat exchange relationship with parts of said source of diatomic oxygen and thereafter at least a portion of said gaseous carbon dioxide is separated from said first portion of said products of combustion and is combined with said diatomic oxygen to form said hybrid air.

7. A method as in claim 6 in which a flow of said hybrid air is directed to said combustion chamber at a predetermined upstream pressure upon engine demand, and said fuel charge is aspirated into said hybrid air flow.

8. A method as in claim 6 in which said hybrid air is compressed and stored, and said compressed hybrid air is directed to said combustion chamber upon engine demand at a predetermined pressure effective to supply the combustion requirements of said engine.

9. An open cycle method of operating an internal combustion engine system having means forming at oxygen in one combustion chamber, a source of liquid or gaseous fuel and having intake, compression, combustion and exhaust phases in its cycle, including the steps of separating oxygen from atmospheric air to provide a source of diatomic oxygen including chemically combining the oxygen in a quantity of preheated atmospheric air under pressure with a reducing agent utilizing the energy of engine waste heat at least in part to form an oxide of said reducing agent capable of dissociating into constituents including diatomic oxygen, separating said oxide from said air, dissociating said oxide at a reduced pressure below said first mentioned pressure into constituents including diatomic oxygen whereby the latter forms said source of oxygen, forming a quantity of hybrid air by combining said diatomic oxygen together with an oxygen diluent comprising a first portion of the products of combustion from said exhaust phase, combining a given charge of said fuel with a quantity of said hybrid air to form a combustion charge containing oxygen an amount to substantially completely combust said charge of fuel, and combusting said charge with said quantity of oxygen whereby the rate of combustion of said fuel charge and oxygen is limited and the products of combustion from said system are substantially released during engine operation.

10. A method as in claim 9 in which said reducing agent comprises a mercury in vapor form and said combining step includes combining said mercury vapor with oxygen of the atmospheric air preheated by the waste heat of engine exhaust products and exhaust nitrogen to form HgO, said dissociating step includes dissociation by high intensity electromagnetic radiation at reduced pressure and temperature into mercury and oxygen, said dissociated mercury is recycled for subsequent combination with oxygen from atmospheric air, and said dissociated oxygen forms said source of oxygen.

11. A method as in claim 10 in which said atmospheric air is preheated to a temperature within the range of substantially 180° – 480° F, and said preheated air is combined with said mercury vapor within a temperature range of substantially 615° – 1,800° F to form a mixture at a temperature below the evaporation temperature of said mercury.

12. A method as in claim 10 in which said high temperature products of combustion from the combustion chamber are directed in heat exchange relationship with said recycled mercury to provide at least a portion of the heat energy to form said mercury vapor.

13. A method as in claim 10 in which the constituents of said atmospheric air remaining after separation of said oxide therefrom are directed, in that order, in heat exhange relationship with incoming atmospheric air to preheat the same prior to combiniation of the oxygen therein with said reducing agent.

14. In an open cycle internal combustion engine system having intake, compression, combustion and exhaust phases in its cycle, means forming at least one combustion chamber, a source of fuel, means separating diatomic oxygen from atmospheric air by chemical process using engine waste heat, means to combine, prior to said combustion phase, a charge of said fuel with said diatomic oxygen in an amount to substantially completely combust said fuel charge in said combustion chamber, means to limit the rate of said combustion including means forming a combustion charge free of nitrogen and comprising said fuel charge and said oxygen together with an oxygen diluent combined prior to said compression phase, and means to exhaust the products of combustion during engine operation.

15. A system as in claim 14 in which said combustion rate limiting means includes means to form a quantity of hybrid air comprising said diatomic oxygen together with said oxygen diluent, said diluent being comprised of carbon dioxide taken from a first portion of the products of combustion from said exhaust phase, said hybrid air comprising a portion of said combustion charge and containing said diluent in sufficient quantity to limit the rate of combustion.

16. A system as in claim 14 which includes means to compress and accumulate as nitrogen free hybrid air, said diluent taken from a first portion of the products of combustion following the exhaust phase of the engine together with said diatomic oxygen in an amount sufficient to completely combust said fuel charge, and means to direct a charge of said accumulated hybrid air combined with said fuel charge into said combustion chamber during the intake phase to form said combustion charge.

* * * * *

PO-1050
(5/69)

UNITED STATES PATENT OFFICE
CERTIFICATE OF CORRECTION

Patent No. 3,792,690            Dated February 19, 1974

Inventor(s) Theodore W. Cooper

It is certified that error appears in the above-identified patent and that said Letters Patent are hereby corrected as shown below:

Column 4, line 8, delete "is" (second occurrance) and substitute --in--;

Column 6, line 20, insert the symbol -- $\longrightarrow$ -- between the symbols "$O_2$" and "$H_2O$";

Column 12, lines 17 and 18, delete "oxygen in" and substitute --least--;

Column 12, line 38, after "oxygen" insert --in--.

Signed and sealed this 5th day of November 1974.

(SEAL)
Attest:

McCOY M. GIBSON JR.
Attesting Officer

C. MARSHALL DANN
Commissioner of Patents